United States Patent [19]
Stine

[11] 3,725,493
[45] Apr. 3, 1973

[54] OXIDATIVE DEHYDROGENATION

[75] Inventor: Roy L. Stine, Borger, Tex.

[73] Assignee: Phillips Petroleum Company Bartlesville Okla.

[22] Filed: Aug. 24, 1970

[21] Appl. No.: 66,559

Related U.S. Application Data

[63] Continuation-in-part of Ser. No. 677,719, Oct. 24, 1967, abandoned.

[52] U.S. Cl.................260/680 E, 260/681.5 R
[51] Int. Cl.................................C07c 5/18
[58] Field of Search.............260/680 E, 681.5

[56] References Cited

UNITED STATES PATENTS

| | | | |
|---|---|---|---|
| 3,420,618 | 1/1969 | Fleming | 260/677 X |
| 3,308,201 | 3/1967 | Bowers et al. | 260/681.5 |
| 3,274,283 | 9/1966 | Bethell | 260/680 |
| 3,320,329 | 5/1967 | Nolan | 260/680 |
| 3,281,489 | 10/1966 | Goering | 260/681.5 |

Primary Examiner—Paul M. Coughlan, Jr.
Attorney—Young and Quigg

[57] ABSTRACT

Hydrocarbons are oxidatively dehydrogenated by contacting them with an oxygen-containing gas and a catalyst and following the dehydrogenation, a hydrogen-containing gas is added to the effluent of the contacting under conditions suitable to cause a reaction between the hydrogen and residual oxygen or oxygenated compounds in the effluent.

7 Claims, No Drawings

OXIDATIVE DEHYDROGENATION

RELATED INVENTIONS

This is a continuation-in-part application of my copending and now abandoned application having Ser. No. 677,719 filed Oct. 24, 1967, entitled: OXIDATIVE DEHYDROGENATION.

BACKGROUND OF THE INVENTION

This invention relates to dehydrogenation. In another aspect, this invention relates to the purification of dehydrogenation effluents by the addition of hydrogen. In a further aspect, this invention relates to the oxidative dehydrogenation of the hydrocarbons and the hydrogenation of the oxidative dehydrogenation effluent to remove oxygen and oxygen-containing contaminants.

A highly reactive dehydrogenation catalyst comprising tin phosphate has recently been disclosed and claimed by Nolan in U.S. Pat. No. 3,320,239. As is set forth in that patent, compounds to be dehydrogenated, preferably selected from the group consisting of alkenes, cycloalkenes, alkylpyridines, alkyl-aromatics, are mixed with oxygen or an oxygen-containing gas, preheated, and passed over a catalyst comprising stannic phosphate at a temperature in the range of 700° to 1,300° F. Generally, the inlet temperature of the gas is around 800° to 900° F.

The oxygen used in the dehydrogenation is present in an excess in order to insure complete conversion of hydrogen released in the dehydrogenation reaction. Therefore, the effluent from the dehydrogenation reaction will contain unreacted oxygen gas as well as a number of oxygenated products of the reaction. This residual oxygen and the oxygenated compounds are corrosive, and are subject to polymerization, and are, therefore, detrimental to the further processing of the hydrocarbon product. It is, therefore, necessary that oxygen and oxygen-containing compounds be removed from the effluent stream before further processing.

Accordingly, an object of this invention is to provide an improved process for the oxidative dehydrogenation of hydrocarbons.

Another object of this invention is to provide a process for the removal of oxygen and oxygen-containing compounds from oxidative dehydrogenation effluents.

A further object of this invention is to provide a process for the purification of hydrocarbon streams containing oxygen and oxygen-containing compounds.

Other objects and aspects, as well as the several advantages of the invention, will be apparent to those skilled in the art upon reading the specification and appended claims.

SUMMARY OF THE INVENTION

My invention consists of oxidatively dehydrogenating a hydrocarbon over a catalyst, and then adding to the effluent of the dehydrogenation reaction a hydrogen-containing gas under conditions suitable to cause a reaction between the hydrogen and residual oxygen and oxygenated compounds in the effluent. The contacting of the dehydrogenation effluent with hydrogen is preferably conducted on the presence of a catalyst.

DESCRIPTION OF THE PREFERRED EMBODIMENTS

The hydrocarbons most suitable for use in the dehydrogenation process of my invention are compounds selected from the group consisting of alkenes, cycloalkenes and alkyl aromatics. These compounds are dehydrogenated at relatively high conversion and selectivity rates with and without the use of steam. Hydrocarbon feedstocks generally preferred which can be dehydrogenated by the present process include open chain, branched chain and cyclic olefins having from three to 10 carbon atoms per molecule. It is also within the scope of the invention to employ mixtures of the olefin hydrocarbons together with open chain, branched chain and cyclic paraffins, when desired. The alkenes contain from three to 10, preferably from four to six, carbon atoms per molecule, inclusive, and the cycloalkenes contain from four to 10, preferably from four to six, carbon atoms per molecule, inclusive. The alkyl aromatics contain from one to four, preferably from one to two, alkyl groups per molecule, which contain from one to six, preferably four to six, carbon atoms per group, inclusive, with at least one alkyl group having at least two carbon atoms.

According to this invention, alkenes such as propylene, n-butene, n-pentene, isopentenes, the octenes, the decenes, and the like can be dehydrogenated. Also, both alkyl-substituted cycloalkenes such as cyclobutene, cyclopentene, cyclohexene, 3-butylcyclohexene, 3-isopentylcyclopentene, and the like can be employed. Similarly, this invention applies to the dehydrogenation of monocyclic aromatics such as ethylbenzene, propylbenzene, n-butyl benzene, isobutyl benzene, hexylbenzene, 1-methyl-2-propylbenzene, 1-butyl-3-hexylbenzene and the like. Preferred reactions according to this invention are the formation of 1,3-butadiene from butenes, 1,3-pentadiene from pentenes, isoprene from the 2-methylbutene, and styrene from ethylbenzene.

The oxidative dehydrogenation of the above-described materials can be carried out in the presence of any known oxidative dehydrogenation catalyst. For example a suitable catalyst is a bismuth molybdate plus the oxides of at least two transition metals of Group VIII as disclosed in U.S. Pat. No. 3,414,631. Another suitable oxidative dehydrogenation catalyst system is a promoted antimony oxide-iron oxide catalyst as described in U.S. Pat. No. 3,409,697. A still further suitable catalyst system is the antimony-uranium catalyst described in U.S. Pat. No. 3,375,291. Another catalyst that can be employed, and one often preferred, is the tin phosphate catalyst disclosed and claimed by Nolan, U.S. Pat. No. 3,320,329, supra.

The tin phosphate catalyst, a presently preferred catalyst, of this invention, is preferably employed in the form of stannic phosphate and can be used in the form of granules, mechanically formed pellets, and the like. The catalyst can also be employed with suitable supporting or diluting materials such as alumina (preferably eta- or gamma-alumina or mixtures thereof), boria, beryllia, magnesia, titania, zirconia, or other similar materials.

The term "stannic phosphate" as employed in this invention is intended to include the compound $Sn_3(PO_4)_4$ as well as mixtures of oxides, e.g., $2SnO_2P_2O_5$. The term also is meant to include oxygen-containing compounds of tin and phosphorus in which the tin has an apparent valence of 4 and the phosphorus has an apparent valence of 5. The term also includes a tin phosphate catalyst containing an alkali metal, such as 2–3 percent lithium.

The catalysts can be prepared by any conventional means such as bringing the catalyst components together in a mill, such as a hammer mill, and milled to a small size, the milled mixture being pelleted and dried to form the final catalyst. Alternately, the catalyst components can be formed into a paste with any suitable liquid such as water and extruded into the desired shape and size. Other methods include dry milling, impregnation and other known methods.

The amount of catalyst employed will vary widely depending upon the material present and the conversion and selectively desired, a primary requirement being that for each reaction an effective catalytic amount is employed. The oxygen can be employed as such or with an inert diluent such as nitrogen and the like. Desirable oxygen-containing gases include air, flue gases containing a residual oxygen, and the like.

The presence of oxygen during the dehydrogenation reaction permits extended operating periods but when catalyst regeneration is necessary, such can be effected simply by terminating the hydrocarbon flow for a sufficient length of time while continuing the flow of oxygen-containing gas at the same or higher rate as desired. The dehydrogenation process is resumed simply by restarting the hydrocarbon flow.

The dehydrogenation process of this invention is ordinarily carried out by forming a mixture, preferably preheated, of the compound to be dehydrogenated and oxygen or an oxygen-containing gas and passing this mixture over the catalyst at the desired temperature. Steam can be added as a diluent and source of heat. Recycle of unconverted compound can be employed, if desired; however, the conversion rates and selectivity of this invention are generally sufficiently high to justify a single step, i.e., single pass, operation, if, for example, the product streams can be used without separation steps in a subsequent operation such as polymerization.

The operating conditions for dehydrogenation can vary widely but will generally include a temperature in the dehydrogenation zone from about 700° to about 1,300°, preferably from about 900° to about 1,200° F, a pressure from about 0.05 to about 50, preferably from about 0.1 to about 25 psia, and an oxygen to hydrocarbon volume ratio of from about 0.1/1 to about 3/1, preferably from about 0.5/1 to about 2/1. The hydrocarbon space rate (volumes hydrocarbon vapor/volume of catalyst/hour, 32° F, 15 psia) can be from about 50 to about 5,000, preferably from about 100 to about 2,500, still more preferably from about 200 to about 1,000. Steam to hydrocarbon volume ratios, when steam is used, are from 5/1 to 30/1, preferably from 10/1 to 20/1.

In accordance with the invention, following the dehydrogenation reaction, hydrogen is added to the effluent in a sufficient quantity to react with residual oxygen and oxygenated compounds in the effluent to substantially reduce or eliminate these compounds from the effluent, the reacting being conducted under conditions such that a minimum amount of the dehydrogenated product present in the effluent is hydrogenated. The effluent from the oxidative dehydrogenation will ordinarily comprise dehydrogenated product, unconverted feedstock, oxygen, and oxygenated products. The amount of hydrogen added will be determined by the amount of oxygen initially added to the dehydrogenation reaction and will be at a hydrogen to hydrocarbon volume ratio of from about 0.2/1 to about 6/1, preferably from about 1/1 to about 6/1. The hydrogen may be added in the form of pure hydrogen gas, diluted with an inert diluent such as nitrogen and the like, or any other convenient hydrogen-containing gas. The reaction of hydrogen with the oxygen and oxygen-containing gases occurs at a temperature from about 250° F to about 1,250° F. However, in order to minimize the loss of dehydrogenated product, the temperature preferably does not exceed about 750° F, more preferably ranges from about 300° F to about 700° F, and a pressure from about 0.05 to about 40, preferably from about 0.1 to about 25 psia. The temperature depends on whether a catalyst is employed and the type of catalyst employed, if any.

The hydrogen contacting with the dehydrogenation effluent can be conducted without a catalyst but metal catalysts containing metal atoms of cobalt, chromium, copper, iron, molybdenum, nickel, palladium, platinum, rhenium, rhodium, or zinc can be used with suitable supporting or diluting materials such as alumina, carbon, silica or other similar materials. Catalysts comprising nickel and platinum are presently preferred. Particularly effective catalysts are nickel-oxide-alumina, nickel oxide, and platinum-alumina which substantially convert the oxygen present in the effluent without hydrogenating the dehydrogenated product.

The hydrogen is added to the effluent following the dehydrogenation reaction because hydrogen is detrimental to the tin phosphate catalyst used in the dehydrogenation. It is, therefore, not possible to add hydrogen to the original feed stream of the dehydrogenation reaction without suffering rapid degradation of the catalyst.

EXAMPLE I

Butenes are dehydrogenated to butadiene using stannic phosphate catalyst at a temperature of 829° F, pressure of 30 psia, olefin space rate of 1,436 vol. olefin vapor/vol. catalyst/hour (32° F, 15 psia), 761 vol. oxygen gas/vol. catalyst/hour (32° F, 15 psia), a total space rate of 5,073 vol. olefin vapor and oxygen-containing gas/vol. of cataýst/hour (32° F, 15 psia), an oxygen/olefin volume ratio of 0.53/1, with oxygen being added as air (about 21 vol. per cent oxygen, 79 vol. percent nitrogen). After dehydrogenation, 1,580 volumes of a hydrogen gas is introduced into the dehydrogenation effluent at a hydrogen/olefin (based on original butenes) volume ratio of 1.1/1 and the mixture is subjected to a temperature of about 700° F, at about 30 psia, to effect noncatalytic reaction of hydrogen with oxygen and oxygen-containing compounds in the effluent, to yield a purified butadiene gas stream.

EXAMPLE II

Butenes are dehydrogenated to butadiene using a catalyst and operating conditions similar to those of Example I. After dehydrogenation, the dehydrogenation effluent is quenched to 750° F with condensate, combined with hydrogen in an amount at least sufficient to convert the oxygen present in the effluent to $H_2O$, and passed over a nickel oxide catalyst at about 750° F and about 30 psia, with a total space rate of about 4,000 vol. of dry gas/vol. of catalyst/hr. measured at standard conditions of 32° F and 15 psia (1 atmosphere, approximately), where one pound mol of a gas occupies about 359 cubic feet volume, the added hydrogen to olefin (based on original olefin) volume ratio being about 0.3/1, to yield a purified butadiene gas stream.

EXAMPLE III

A simulated butene oxidative dehydrogenation effluent comprising steam, butadiene, air and hydrogen, with a 1:1:1 mol ratio of butadiene, air and hydrogen and a 20:1 mol ratio of steam to butadiene was contacted with nickel and platinum catalysts at a gas hourly space velocity of 400 volumes of butadiene per volume of catalyst per hour. The reaction pressure for all runs was one atmosphere. The results of these tests are set forth in Table I.

TABLE I

| Catalyst Used | Temp. system, °F | Vol. % oxygen conversion | Vol. % butadiene Loss |
|---|---|---|---|
| 1% Nickel Oxide on Alumina | 600 | 52.7 | 1.1 |
| " | 700 | 99.4 | 4.46 |
| " | 800 | 99.8 | 13.20 |
| " | 900 | 99.8 | 33.37 |
| 10% Nickel Oxide on Alumina | 600 | 5.0 | 0.45 |
| " | 700 | 43.0 | 1.80 |
| 10% Nickel Oxide on Filtrol | 800 | 99.7 | 7.83 |
| 10% Nickel Oxide on Gamma Alumina | 900 | 99.7 | 39.0 |
| Nickel Oxide Alone | 500 | 96.0 | 1.7 |
| " | 600 | 99.8 | 1.91 |
| " | 700 | 99.9 | 2.95 |
| "800 | | 99.3 | 41.0 |
| " | 900 | (reactor coked) | |
| 0.35 wt. % Platinum on Alumina | 600 | 99.9 | 1.43 |
| " | 700 | 99.9 | 2.73 |
| " | 800 | 99.8 | 6.60 |
| " | 900 | 99.9 | 9.73 |

It can be seen from the above tests that the amount of butadiene, the dehydrogenated product, lost in the effluent by hydrogenation to such as butenes is minimized when the hydrogenation is effected at a temperature below about 700° F. At temperatures above about 900° F, substantial coke formation occurs, depending upon the catalyst used. It is now preferred to operate at below about 750° F in order to minimize the loss of butadiene product, preferably keeping the butadiene loss to below about 10 volume percent, more preferably below about 5 volume per cent of the butadiene in the product stream. From an economic standpoint butadiene loss must be at a minimum.

I claim:

1. A process for the oxidative dehydrogenation of hydrocarbons wherein an effluent product stream containing low concentrations of oxygen is obtained which comprises
    a. contacting a feedstock comprising $C_4$ and $C_5$ alkene hydrocarbons and an oxygen-containing gas with an oxygen to hydrocarbon volume ratio of about 0.1/1 to about 3/1 with an oxidative dehydrogenation catalyst at oxidative dehydrogenation conditions to form an effluent stream comprising diene hydrocarbon product, unconverted alkene hydrocarbon, oxygen-containing gas and oxygenated products of the reaction,
    b. adding to said effluent stream a hydrogen-containing gas within a hydrogen to hydrocarbon volume ratio of 0.2/1 to about 6/1 sufficient to cause reaction between said hydrogen-containing gas and said oxygen-containing gas present in said effluent, and
    c. subjecting said effluent stream containing added hydrogen to hydrogenation conditions in the presence of a hydrogenation catalyst consisting essentially of nickel oxide, nickel oxide-alumina, or platinum-alumina, at a temperature below about 750° F and a pressure sufficient to substantially eliminate the oxygen present in said effluent with loss of diene hydrocarbon product being below about 10 volume percent of the diene hydrocarbon in said stream.

2. A process according to claim 1 wherein said feedstock comprises butenes and said effluent comprises butadiene and step (c) is catalyzed by contacting with a nickel oxide-alumina catalyst.

3. A process according to claim 1 wherein said feedstock comprises butenes and said effluent comprises butadiene and step (c) is catalyzed by contact with a platinum-alumina catalyst.

4. A process according to claim 1 wherein the feedstock comprises butenes and the butadiene-containing effluent contains steam within a ratio of steam to hydrocarbon in the range 5/1 to 30/1.

5. A process according to claim 1 wherein said oxidative dehydrogenation catalyst is tin phosphate, and step (c) is catalyzed with a nickel oxide-alumina or a platinum-alumina catalyst.

6. A process according to claim 1 wherein the feedstock comprises butenes and said effluent comprises butadiene and the temperature of step (c) is below about 700° F. and the loss of butadiene product is below about 5 volume percent of the butadiene in said stream.

7. A process according to claim 1 wherein said feedstock comprises butenes and said effluent comprises butadiene and said hydrogenation catalyst is nickel oxide.

* * * * *